(No Model.) 2 Sheets—Sheet 2.
M. WEYL.
TELESCOPIC STAND FOR MATHEMATICAL AND OPTICAL INSTRUMENTS, &c.
No. 505,149. Patented Sept. 19, 1893.
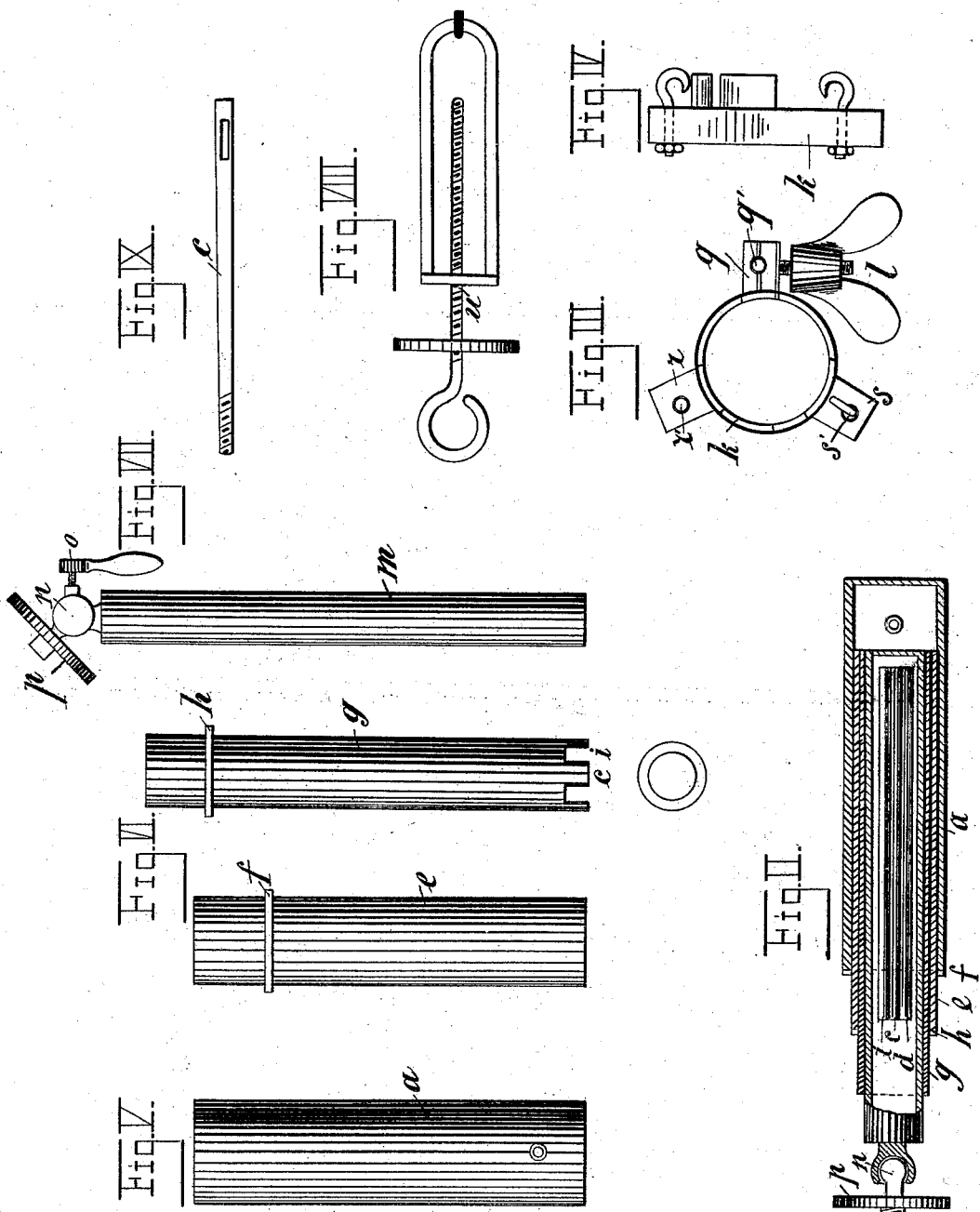
Attest
Walter Donaldson
James M. Spear
Inventor
Maximilian Weyl
by Ellis Spear
Atty.

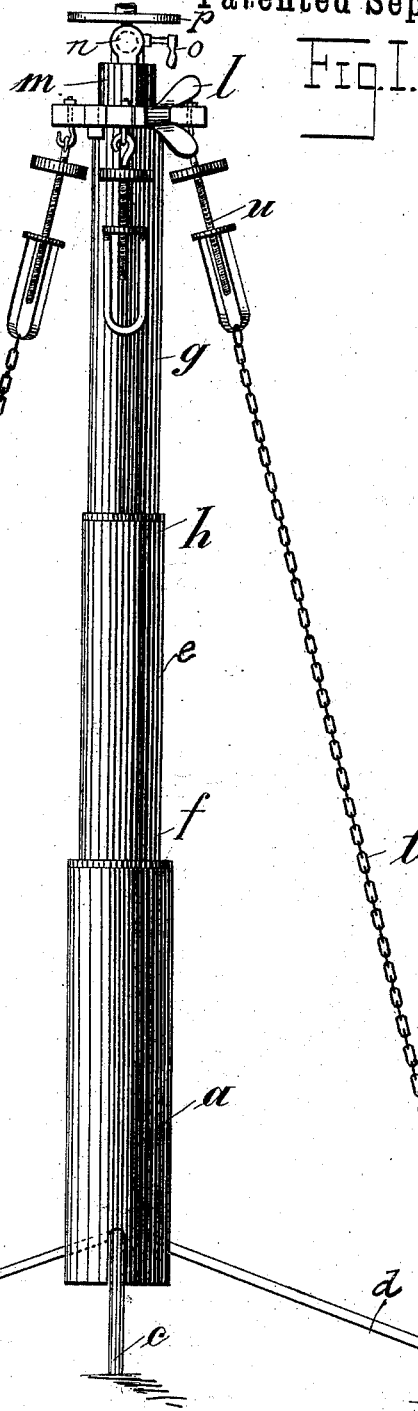

UNITED STATES PATENT OFFICE.

MAXIMILIAN WEYL, OF BERLIN, GERMANY.

TELESCOPIC STAND FOR MATHEMATICAL AND OPTICAL INSTRUMENTS, &c.

SPECIFICATION forming part of Letters Patent No. 505,149, dated September 19, 1893.

Application filed November 28, 1892. Serial No. 453,444. (No model.)

*To all whom it may concern:*

Be it known that I, MAXIMILIAN WEYL, engineer, of Berlin, in the Kingdom of Prussia and German Empire, have invented a new and useful Improved Telescopic Stand for Mathematical and Optical Instruments and the Like, of which the following is a specification, reference being had therein to the accompanying drawings.

My improvements relate to a portable stand which when put together possesses a great amount of firmness combined with a comparatively light weight, and occupies a small space when packed together.

In order that my invention may be better understood and more readily carried into effect I will proceed to describe the drawings hereunto annexed.

The same letters refer to the same parts in the several figures of the drawings.

Figure 1 illustrates an elevation of the stand as erected for use. Fig. 2 represents the stand when packed together ready for transit. Fig. 3 is a plan of the top ring. Fig. 4 is a side view of Fig. 3. Figs. 5, 6 and 7 represent the casings which fit into each other as illustrated in Fig. 2. Fig. 8 is a view of the stretching screw forming the connection and means of adjustment of the chain to the upper ring. Fig. 9 is a side view of the hook Fig. 8.

$a$ is a tube open at its upper end and closed at the bottom by a lid. At the lower end of the said tube three openings are provided into which the feet $b$, $c$ and $d$ are screwed in proper oblique positions, in order that suitable support may be given to the instrument stand when erected. In the upper end of the tube $a$ is fitted another tube $e$ provided with a shoulder $f$ thereby preventing the tube $e$ from sliding farther down the tube $a$. A third tube $g$ is inserted in the tube $e$ and is again prevented from sliding farther down the tube $e$ than is considered necessary by a shoulder $h$. It is obvious that any number of such tubes may be provided each one fitting into another and being prevented from being pressed down into the next tube farther than it is required, by means of shoulders.

The tube $g$ is provided at its upper end with indentations or notches, Fig. 6, into which fits by means of pins a ferrule or upper ring $k$ Fig. 3. The internal diameter of the latter can be decreased or enlarged by means of the thumb nut $l$. The ferrule $k$ surrounds a tube $m$ the position of which with regard to height can be fixed by tightening the ferrule $k$. The upper end of the tube $m$ is, by means of a ball and socket joint $n$ and set screw $o$ connected to the upper plate or stand $p$ for the support of the photographic camera or any instrument connected with surveying or for mathematical, optical, or any suitable purposes. The ferrule $k$ is provided with three projections $s$ $r$ and $q$ and fitted on the under side with hooks $s'$, $r'$, $q'$ respectively. These hooks fit into the hooks of the stretching screws $u$ which by means of chain are attached to the feet $b$, $c$, $d$. The stretching screws can, if desirable, be connected to hooks on the feet $b$, $c$, $d$, in lieu of on the ferrule or upper ring. It is obvious that by means of the stretching screws adjustment can be made and a firm position given to the stand. For the purpose of packing the stand the stretching screws $u$ are loosened and the chains unhooked, the tube $e$ is drawn out of the tube $a$ and the tube $g$ out of the tube $e$. They are then reversed as shown in Fig. 2 so that they rest upon the shoulders of each upon the ends of the tubes, preventing them falling to the bottom. The ferrule $k$ is pushed close to the joint $n$. After this has been done the feet $b$, $c$ and $d$ which have also been unscrewed are put into the interior of the tubes as shown in Fig. 2. The tube $m$ is also placed, as will be seen in Fig. 2, for the purpose of packing, inside the tube $g$.

It is obvious, as will be seen from Fig. 2, that when packed up this forms a handy and compact parcel, and the chains of course are carried separately. It is also obvious that although I have shown the various pieces forming the telescope, of tube section, they can be made of any other section the particular form of section not being necessary to the principle of my invention.

What I claim, and desire to secure by Letters Patent of the United States, is—

1. In combination with the series of tubes fitting one within the other and provided with shoulders, a ferrule secured to the upper tube an adjustable tube $m$ clamped by the ferrule, an adjustable support carried by said tube $m$ and stay chains, substantially as described.

2. In combination with the series of tubes fitting one within the other and provided with shoulders, diverging feet supporting the lower tube, a ferrule mounted upon the upper tube, and stay chains connecting said ferrule with the extremities of the feet, substantially as described.

In witness whereof I have hereunto set my hand in presence of two witnesses.

MAXIMILIAN WEYL.

Witnesses:
PAUL FISCHER,
W. H. EDWARDS.